United States Patent [19]

Chapuis et al.

[11] Patent Number: 4,752,828
[45] Date of Patent: Jun. 21, 1988

[54] METHOD FOR PRODUCING A GEOMETRICAL TRANSFORMATION ON A VIDEO IMAGE AND DEVICES FOR CARRYING OUT SAID METHOD

[75] Inventors: Franck Chapuis, Rennes; Jacques Oyaux, St. Gratien; Kiet N. Xuan, Mery-Sur-Oise, all of France

[73] Assignee: Thomson CSF, Paris, France

[21] Appl. No.: 70,128

[22] Filed: Jul. 2, 1987

Related U.S. Application Data

[63] Continuation of Ser. No. 608,195, May 8, 1984, abandoned.

[30] Foreign Application Priority Data

May 11, 1983 [FR] France .................. 83 07904

[51] Int. Cl.$^4$ .......................... H04N 9/74; H04N 5/262
[52] U.S. Cl. ...................................... 358/183; 358/22; 364/521
[58] Field of Search ............... 358/22, 183, 21 R, 100; 382/41, 44, 45, 46, 47; 340/798; 364/521, 522

[56] References Cited

U.S. PATENT DOCUMENTS

| | | | |
|---|---|---|---|
| 4,011,401 | 3/1977 | Presti | 358/183 X |
| 4,266,242 | 5/1981 | McCoy | 358/22 |
| 4,432,009 | 2/1984 | Reitmeier et al. | 358/22 |
| 4,437,121 | 3/1984 | Taylor et al. | 358/160 |
| 4,472,732 | 9/1984 | Bennett et al. | 358/22 |
| 4,533,952 | 8/1985 | Norman, III | 358/160 |
| 4,622,588 | 11/1986 | Chapuis | 358/183 |

FOREIGN PATENT DOCUMENTS

2275093 6/1974 France .
81/02939 10/1981 PCT Int'l Appl. .
WO82/00394 2/1982 PCT Int'l Appl. .

*Primary Examiner*—James J. Groody
*Assistant Examiner*—Robert M. Bauer
*Attorney, Agent, or Firm*—Cushman, Darby & Cushman

[57] ABSTRACT

Special effects are produced on video images by means of a method of geometrical transformation which can involve a translation, a rotation, an affine transformation or an effect of perspective. The method consists:

in locating each point of the initial image by means of coordinates (X, Y, O) in a cartesian reference frame designated as a movable reference frame and related to the initial image;

in representing each point of the initial image by a binary word;

in storing the initial image in a storage device having two read address inputs and one data output, the function of the device being to deliver a binary word corresponding to the point with coordinates (X, Y, O) in the initial image when read address values X and Y are applied respectively to the two inputs:

in causing each point of the transformed image resulting from an initial-image transformation to be located by means of coordinates ($X_3$, $Y_3$, O) in a cartesian reference frame which is related to the transformed image and designated as a fixed reference frame;

in representing each point of the transformed image by a binary word M supplied by the storage device by applying values of X and Y to the read address inputs of the device, these values being computed as a function of the coordinates ($X_3$, $Y_3$, O) of said point and as a function of the geometrical transformation parameters.

17 Claims, 9 Drawing Sheets

METHOD FOR PRODUCING A GEOMETRICAL TRANSFORMATION ON A VIDEO IMAGE AND DEVICES FOR CARRYING OUT SAID METHOD

This is a continuation of application Ser. No. 608,195, filed May 8, 1984, which was abandoned upon the filing hereof.

BACKGROUND OF THE INVENTION

1. Field of the Invention

This invention relates to special effects produced on video images. The geometrical transformation involved in this process can be either a translation, an affine transformation, a rotation or an effect of perspective. If so required, a combination of these effects may also be contemplated.

2. Description of the Prior Art

A geometrical transformation of shapes can be applied to any video image scanned by a camera but is also applicable to an image which is generated electronically by means of devices known as image background generators. These devices generate a video signal corresponding to an image comprising, for example, colored rectangles on which credit titles are displayed. There also exists another type of device known as an electronic shape generator which, in conjunction with a device called a variable-gain switcher, makes it possible to combine two video signals in order to obtain an image in which certain portions are provided by one of the video signals whilst the other portions are provided by the other video signal. For example, a shape generator associated with a variable-gain switcher permits the formation of an image having a background which is supplied by a first video signal and comprises an inset with blurred edges supplied by a second video signal. It is desirable to have the capability of producing very different and variable shapes, according to the requirements of users.

It is a known practice to produce a vertical or horizontal compression or expansion of any video image by means of a digital process. For example, in order to produce a vertical image compression, the video signal is sampled at the standard sampling frequency of 13.5 MHz. Certain samples are then abandoned and the values of the remaining samples are written into a buffer memory having a capacity equal to one image. The write address values in the buffer memory are incremented at a mean rate which is lower than the sampling frequency. When the compression (packing) ratio is not equal to an integral value, the numerical values written into the buffer memory are determined by an interpolation. The buffer memory is then read by incrementing the read address values at a rate corresponding to the standard sampling frequency.

The performance of a rotation entails the need for more complex calculations and is thus difficult to achieve in real time. The method in accordance with the invention makes it possible to produce either a translation or a rotation or an affine transformation, or a combination of these elementary transformations, as well as to carry out a projection and thus to obtain an effect of perspective with a sufficient degree of simplicity of calculation to permit practical application in real time.

There are already a number of known methods for producing geometrical transformations on an image generated by an electronic shape generator associated with a variable-gain switcher. The method adopted depends on the type of generator employed. In order to produce signals for controlling the switcher, conventional shape generators comprise sawtooth-signal generators and parabolic signal generators. These signal generators can be either analog or digital generators. Analog analog generators have poor time stability because of temperature variations, tolerances of components, aging, and so on. Digital generators are not subject to the problem of stability of adjustments and are easier to adjust. However, the shapes obtained are not only of a simple type, but the geometrical transformations which are achievable in practice are limited in number. It is known, for example, to carry out a rotation of a square but not of a lozenge or of a star. It is also known to form blurred edges or colored borders, to perform a translation or a multiplication of patterns but without any possibility of effecting a rotation at the same time. The method in accordance with the invention makes it possible to overcome the disadvantages attached to electronic shape generators of known types.

SUMMARY OF THE INVENTION

A first object of the invention is to provide a method for producing a geometrical transformation on a video image designated as an initial image. The method under consideration essentially consists:

in locating each point of the initial image by means of coordinates in a cartesian reference frame designated as a movable reference frame and related to said initial image;

in representing each point of the initial image by a binary word;

in storing the initial image in a storage device having two read address inputs and one data output, the function of said device being to deliver a binary word corresponding to the point with coordinates (X, Y, O) in the initial image when read address values X and Y are applied respectively to the two inputs;

in causing each point of the transformed image resulting from an initial-image transformation to be located by means of coordinates ($X_3$, $Y_3$, O) in a cartesian reference frame which is related to said transformed image and designated as a fixed reference frame;

in representing each point of the transformed image by a binary word M supplied by the storage device by applying values of X and Y to the read address inputs of said device, said values being computed as a function of the coordinates ($X_3$, $Y_3$, O) of said point and as a function of the geometrical transformation parameters.

A second object of the invention is to provide a device for applying said method to any video image.

A third object of the invention is to provide an electronic shape-generating device for carrying out the method in accordance with the invention.

BRIEF DESCRIPTION OF THE DRAWINGS

Other features of the invention will be more apparent upon consideration of the following description and accompanying drawings, wherein.

DETAILED DESCRIPTION OF THE INVENTION

Figure 1:
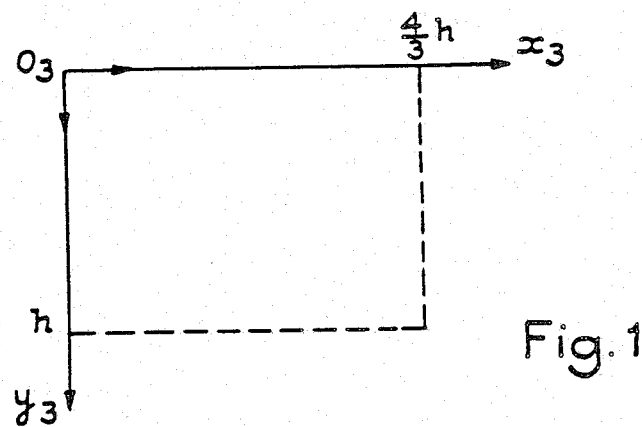
FIGS. 1 to 6 and 8 to 17 illustrate the method in accordance with the invention.

There is shown in FIG. 1 a cartesian reference frame ($O_3$, $x_3$, $y_3$) designated as a fixed reference frame since it is related to the transformed image which is desired to be obtained on a video screen. In a first step, the coordinates $x_3$ and $y_3$ correspond to a unit of length such as one millimeter, for example. In the case of a television image having a length equal to 4/3 of its width, the dashed line defines with the axes the edges of an image having a width h and a length 4/3 h. The only visible portion of the transformed image will be the portion located within this rectangle.

Figure 2:
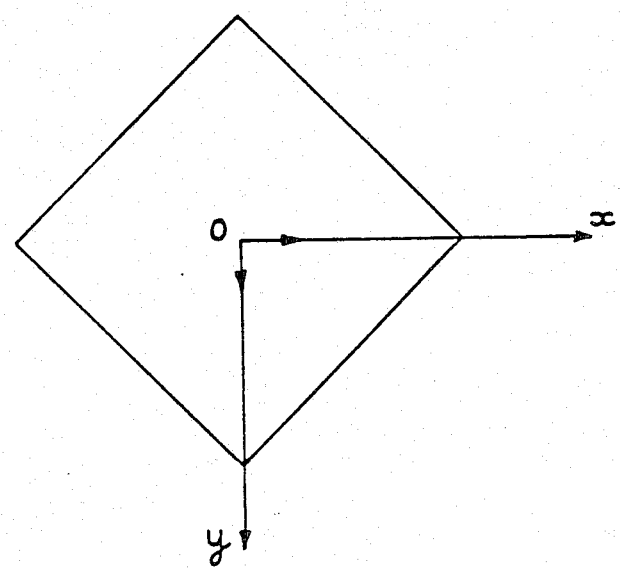

FIG. 2 represents one example of an initial image consisting of a square. The points of this initial image are located in a cartesian frame of reference (O, x, y). In a first step, the units considered on these axes are units of length such as one millimeter. In this example, the origin O of the reference frame is located at the center of the square and the axes coincide with the diagonals of the square.

Figure 3:
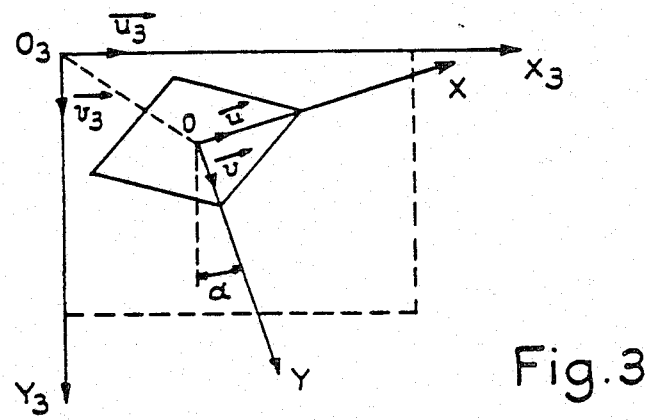

FIG. 3 represents the transformed image resulting from an initial-image transformation composed of a rotation through an angle $\alpha$ about the origin O of the movable reference frame, of an affine transformation having a ratio $A_x$ in the direction of the axis $\overline{Ox}$ and having a ratio $A_y$ in the direction of the axis $\overline{Oy}$, and of a translation defined by the vector $\overline{O_3O}$ which connects the origins of the two reference frames. The coordinates ($x_3$, $y_3$) and (x, y) are related in accordance with the following relation:

$$\begin{bmatrix} x_3 \\ y_3 \end{bmatrix} = \begin{bmatrix} A_x \\ A_y \end{bmatrix} \times \begin{bmatrix} \cos\alpha, & -\sin\alpha \\ \sin\alpha, & \cos\alpha \end{bmatrix} \times \left[ \begin{bmatrix} x \\ y \end{bmatrix} + \begin{bmatrix} x_{03} \\ y_{03} \end{bmatrix} \right] \quad (1)$$

($x_{O3}$, $y_{O3}$) are the coordinates of the origin $O_3$ in the movable reference frame defined earlier. The relation which is reverse to this latter serves to determine the coordinates (x, y) of a point of the initial image corresponding to a point having coordinates ($x_3$, $y_3$) of the transformed image:

$$x = \frac{\cos\alpha}{A_x}(x_3 - x_{03}) + \frac{\sin\alpha}{A_x}(y_3 - y_{03}) \quad (2)$$

$$y = -\frac{\sin\alpha}{A_y}(x_3 - x_{03}) + \frac{\cos\alpha}{A_y}(y_3 - y_{03})$$

In practice, the location of the points of the initial image and of the transformed image is not determined with respect to a unit of length but with respect to the pitch of a grid since a digital television image is considered as made up of non-continuous rectangular elements usually designated as points. By way of example, a television image can be made up of 720 points per line and can comprise 576 lines per image.

In this example, the units of length in the fixed reference frame are accordingly as follows:

$$u_3 = \frac{4}{3} \times \frac{h}{720}$$

$$v_3 = \frac{h}{576}$$

The units of length of the movable reference frame as related to the initial image are modified in like manner. The values are the same as for the fixed reference frame if the initial image is any television image comprising 720 points per line and 576 lines per image. On the other hand, if the initial image is an image consisting of N points per line and comprising M lines per image, the units are in that case as follows:

$$u = \frac{4}{3} \times \frac{h}{N}$$

$$v = \frac{h}{M}$$

After these changes of units, the coordinates in the movable reference frame and in the fixed reference frame are designated respectively by the notations (X, Y) and ($X_3$, $Y_3$). Relation (2) becomes:

$$X = \frac{\cos\alpha}{A_x}(X_3 - X_{03}) \cdot \frac{u_3}{u} + \frac{\sin\alpha}{A_x}(Y_3 - Y_{03}) \cdot \frac{v_3}{v} \quad (3)$$

$$Y = -\frac{\sin\alpha}{A_y}(X_3 - X_{03}) \cdot \frac{u_3}{u} + \frac{\cos\alpha}{A_y}(Y_3 - Y_{03}) \cdot \frac{v_3}{v}$$

($X_{O3}$, $Y_{O3}$) are the coordinates of $O_3$ in the movable reference frame after the changes of units. Relation (3) can be written in the form:

$$\begin{bmatrix} X \\ Y \end{bmatrix} = \begin{bmatrix} I_{xx}, & I_{xy} \\ I_{yx}, & I_{yy} \end{bmatrix} \begin{bmatrix} X_3 - X_{03} \\ Y_3 - Y_{03} \end{bmatrix} \quad (4)$$

where the coefficients $I_{xx}$, $I_{xy}$, $I_{yx}$, $I_{yy}$ are constant coefficients in the case of a given geometrical transformation.

In order to produce a geometrical transformation on any video image formed by a television camera, for example, the initial image is stored in an image memory by writing at an address (X, Y) a binary word constituted by the digital values provided by digitization of the video signal. The values of X and Y are constituted respectively by the rank or position of the point within its line and by the rank or position of its line in the initial image. In order to generate a video signal corresponding to the transformed image, the image memory is read at an address (X, Y) given by relation (4) at the instant at which the video signal corresponding to the point with coordinates ($X_3$, $Y_3$) of the transformed image is intended to be regenerated. The coordinates ($X_3$, $Y_3$) are constituted by the rank of this point on its line and by the rank of its line in the transformed image. Computation of the value of X and Y as a function of the value of $X_3$ and $Y_3$ by means of relation (4) is a very long procedure since it involves four multiplications. However, the method in accordance with the invention determines X and Y by means of a recurrence, which permits a considerable reduction of the time required for computation. The method consists in computing a value of X and Y as a function of the value computed in the case of the immediately preceding point during scanning of the transformed image. The transition from one point having coordinates ($X_3 - 1$, $Y_3$) to the following point having coordinates ($X_3$, $Y_3$) is represented in accordance with relation (4) by a variation of X equal to $I_{xx}$ and by a variation Y equal to $I_{yx}$:

$$X(X_3, Y_3) = X(X_3-1, Y_3) + I_{xx}$$

$$Y(X_3, Y_3) = Y(X_3-1, Y_3) + I_{yx} \quad (5)$$

For each point of the transformed image, computation of the read address values in the storage device merely involves the need to add a constant increment $I_{xx}$ to the value of X computed in an immediately preceding step and to add a constant increment $I_{yx}$ to the value of Y computed in an immediately preceding step.

At the beginning of each line of the transformed image, the value of X and of Y is computed in accordance with a relation different from relation (4). However, the following recurrence relation is deduced therefrom:

$$X(O, Y_3) = X(O, Y_3-1) + I_{xy}$$

$$Y(O, Y_3) = Y(O, Y_3-1) + I_{yy} \quad (6)$$

And in the case of the first point of the first line of the transformed image, relation (4) gives the following values:

$$X(O, O) = -I_{xx} \cdot X_{O3} - I_{xy} \cdot Y_{O3}$$

$$Y(O, O) = -I_{YX} \cdot X_{O3} - I_{yy} \cdot Y_{O3} \quad (7)$$

Computation of the values X(O, O) and Y(O, O) involves four multiplications, which takes a long time but. However, this is of no importance since this computation takes place only once per image and can be performed during the time interval which elapses between scanning of two successive images.

A more complex geometrical transformation can be composed not only of a rotation, of an affine transformation and of a translation, but also of a projection which produces an effect of perspective. In this case, the points of the transformed image are located in a cartesian reference frame ($O_3$, $X_3$, $Y_3$, $Z_3$), the plane of the video screen in which the transformed image is formed being the plane ($O_3$, $X_3$, $Y_3$). In order to produce an effect of perspective, each point of the initial image is projected on the plane ($O_3$, $X_3$, $Y_3$) along a straight line which passes through a point $P_F$, the so-called vanishing point.

Figure 4:
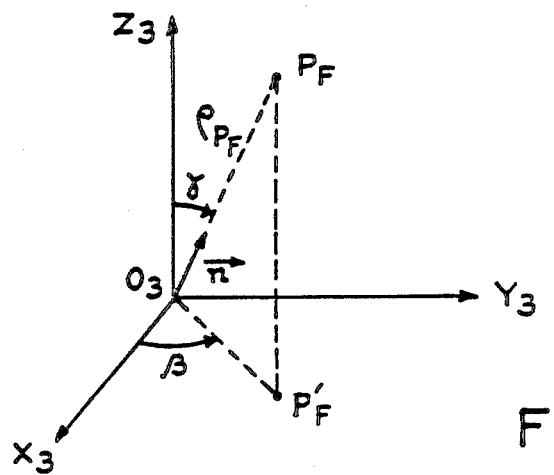

FIG. 4 shows the vanishing point $P_F$ in the reference frame ($O_3$, $X_3$, $Y_3$, $Z_3$) and has the following spherical coordinates:

$$\begin{bmatrix} \rho_{PF} \\ \beta = (O_3 X_3, O_3 P_F') \\ \gamma = (O_3 Z_3, O_3 P_F) \end{bmatrix} \begin{array}{l} \text{such that } \overrightarrow{O_3 P_F} = \rho_{PF} \cdot \vec{n}, \\ \text{where } \vec{n} \text{ is a unit vector, and} \\ \text{where } P'_F \text{ is the orthogonal} \\ \text{projection of } P_F \text{ on the} \\ \text{plane } (O_3, X_3, Y_3) \end{array}$$

The points of the initial image are located in a cartesian reference frame ($O_3$, X, Y, Z) or the so-called movable reference frame whose axis $\overline{O_3Z}$ passes through the vanishing point $P_F$ in the direction $\overline{O_3 P_F}$.

Figure 5:
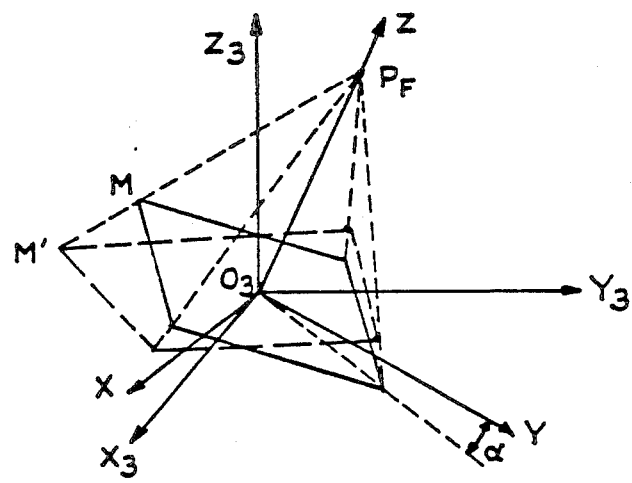

FIG. 5 shows the fixed reference frame, the movable reference frame, a geometrical figure in full lines and a geometrical figure in dashed lines. The initial image (not shown in this figure) consists of a square located in the plane $O_3$ X Y and centered at $O_3$. A rotation through an angle $\alpha$ about the point $O_3$ in the plane $O_3$ X Y and an affine transformation having coefficients ($A_x$, $A_y$, 1) are performed on the initial image. The transformed figure obtained as a result of these first transformations is constituted by the figure shown in full lines which is a lozenge whose diagonals have an angular displacement $\alpha$ with respect to the axes $O_3X$ and $O_3Y$. Each point M of the lozenge is projected to a point M' in the direction $MP_F$ on the plane $O_3X_3Y_3$ in order to constitute a transformed image, as represented in dashed outline in FIG. 5. The center of the square of the initial image has not been modified by the rotation in affine transformation, and does not modify by the projection, but remains at the point $O_3$.

$O_3$ X, $O_3$ Y, $O_3$ Z has a transform in said reference frame consisting of a point with coordinates ($X_2$, $Y_2$, $Z_2$) which are given by the following formulae:

$$\begin{bmatrix} X_2 \\ Y_2 \\ Z_2 \end{bmatrix} = \begin{bmatrix} \cos\alpha & -\sin\alpha & 0 \\ \sin\alpha & -\cos\alpha & 1 \\ 0 & 0 & 1 \end{bmatrix} \begin{bmatrix} A_x & 0 & 0 \\ 0 & A_y & 0 \\ 0 & 0 & 1 \end{bmatrix} \begin{bmatrix} X \\ Y \\ Z \end{bmatrix} \quad (9)$$

Each point M of said lozenge having coordinates ($X_2$, $Y_2$, $Z_2$) is projected to a point M' in the direction M $P_F$ on the plane $O_3$ $X_3$ $Y_3$ in order to constitute a transformed image as represented in dashed outline in the figure. The center of the square of the initial image has not been modified by the rotation and affine transformation and is not modified by this projection but remains at the point $O_3$. It is worthy of note that some of the points of the lozenge are projected on a first face of the plane $O_3$ $X_3$ $Y_3$ whereas the other points are projected on the other face of said plane. The point M has the coordinates ($X_2$, $Y_2$, O) in the movable reference frame and the coordinates ($X_1$, $Y_1$ $Z_1$) in the fixed reference frame, these coordinates being related in accordance with the following relation $$\begin{bmatrix} X_1 \\ Y_1 \\ Z_1 \end{bmatrix} = \begin{bmatrix} \cos\beta \cdot \cos\gamma, & -\sin\beta, & \sin\gamma \cdot \cos\beta \\ \cos\gamma \cdot \sin\beta, & \cos\beta, & \sin\gamma \cdot \sin\beta \\ \sin\gamma, & O, & \cos\gamma \end{bmatrix} \begin{bmatrix} X_2 \\ X_2 \\ O \end{bmatrix} \quad (10)$$

Figure 6:
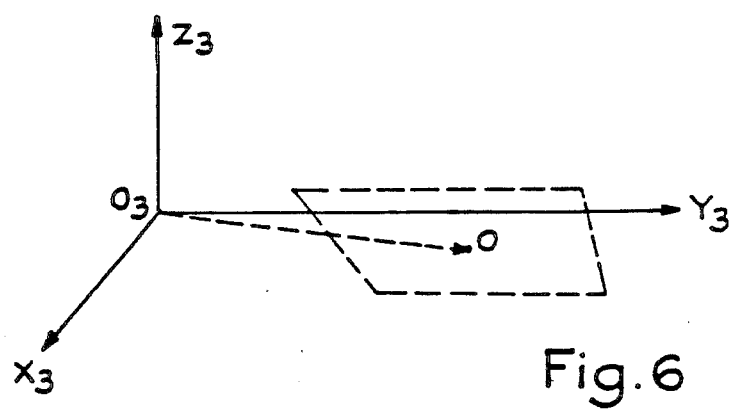

FIG. 6 represents the definitive transformed figure obtained as a result of a final transformation which is a translation, having a vector $O_3$ O, of the projected figure previously obtained. The components of the translation vector $OO_3$ are noted ($X_{O3}$, $Y_{O3}$, $Z_{O3}$) and the coordinates of the definitive transformed image are noted ($X_3$, $Y_3$, $Z_3$). By combining classical mathematical relations describing the above-mentioned rotation upon transformation, projection, and translation, it becomes possible to establish relations between the values of the coordinates (X, Y, Z) and ($X_3$, $Y_3$, $Z_3$) of a point of the initial image located in the movable reference frame and of a point of the transformed image located in the fixed reference frame. By reversing these relations, it is possible to determine the coordinates of a point of the initial image corresponding to a given point of the transformed image. These relations are as follows:

$$X = k(D_{xx} \cdot (X_3 - X_{03}) + D_{xy} \cdot (Y_3 - Y_{03})) \quad (13)$$

$$Y = k(D_{yx} \cdot (X_3 - X_{03}) + D_{yy} \cdot (Y_3 - Y_{03}))$$

$$\frac{1}{k} = 1 - k_x \cdot (X_3 - X_{03}) + k_y \cdot (Y_3 - Y_{03})$$

with $$D_{xx} = \frac{\cos\alpha \cos\beta \cos\gamma + \sin\alpha \sin\beta}{A_x} \quad (14)$$

$$D_{xy} = \frac{\cos\alpha \sin\beta \cos\gamma + \sin\alpha \cos\beta}{A_y}$$

$$D_{yx} = -\frac{\sin\alpha \cos\beta \cos\gamma + \cos\alpha \sin\beta}{A_y}$$

$$D_{yy} = \frac{-\sin\alpha \sin\beta \cos\gamma + \cos\alpha \cos\beta}{A_y}$$

$$k_x = \frac{\cos\beta \sin\gamma}{\rho_{PF}}$$

$$k_y = \frac{\sin\beta \sin\gamma}{\rho_{PF}}$$

The application of the formulae (13) makes it necessary to compute the function of $X_3$ and $Y_3$, that is to say in respect of each point. This computation is a time-consuming operation since it entails the need for two multiplications in the general case. On the other hand, in the particular case in which the vanishing point recedes to infinity, $\rho_{PF}$ is therefore permanently infinite (k=1).

Relation (13) can be simplified and expressed in the form of a recurrence relation which is similar to that found in the absence of perspective effects:

$$X(X_3, Y_3) = X(X_3-1, Y_3) + D_{xx}$$

$$Y(X_3, Y_3) = Y(X_3-1, Y_3) + D_{yx} \quad (15)$$

In the case of the first point of each line, the recurrence relation is as follows:

$$X(0, Y_3) = X(0, Y_3-1) + D_{xy}$$

$$Y(0, Y_3) = Y(0, Y_3-1) + D_{yy} \quad (16)$$

In the case of the first point of an image, relation (13) gives the following values:

$$X(0, 0) = -D_{xx} X_{03} - D_{xy} Y_{03}$$

$$Y(0, 0) = -D_{yx} X_{03} - D_{yy} Y_{03} \quad (17)$$

This simplification limits the possible effects of perspective but has the appreciable advantage of providing a transformation which is not more complicated to produce than a transformation without perspective effect since the recurrence formulae are of the same form. Current technology makes it possible to perform these calculations in real time.

Figure 7:
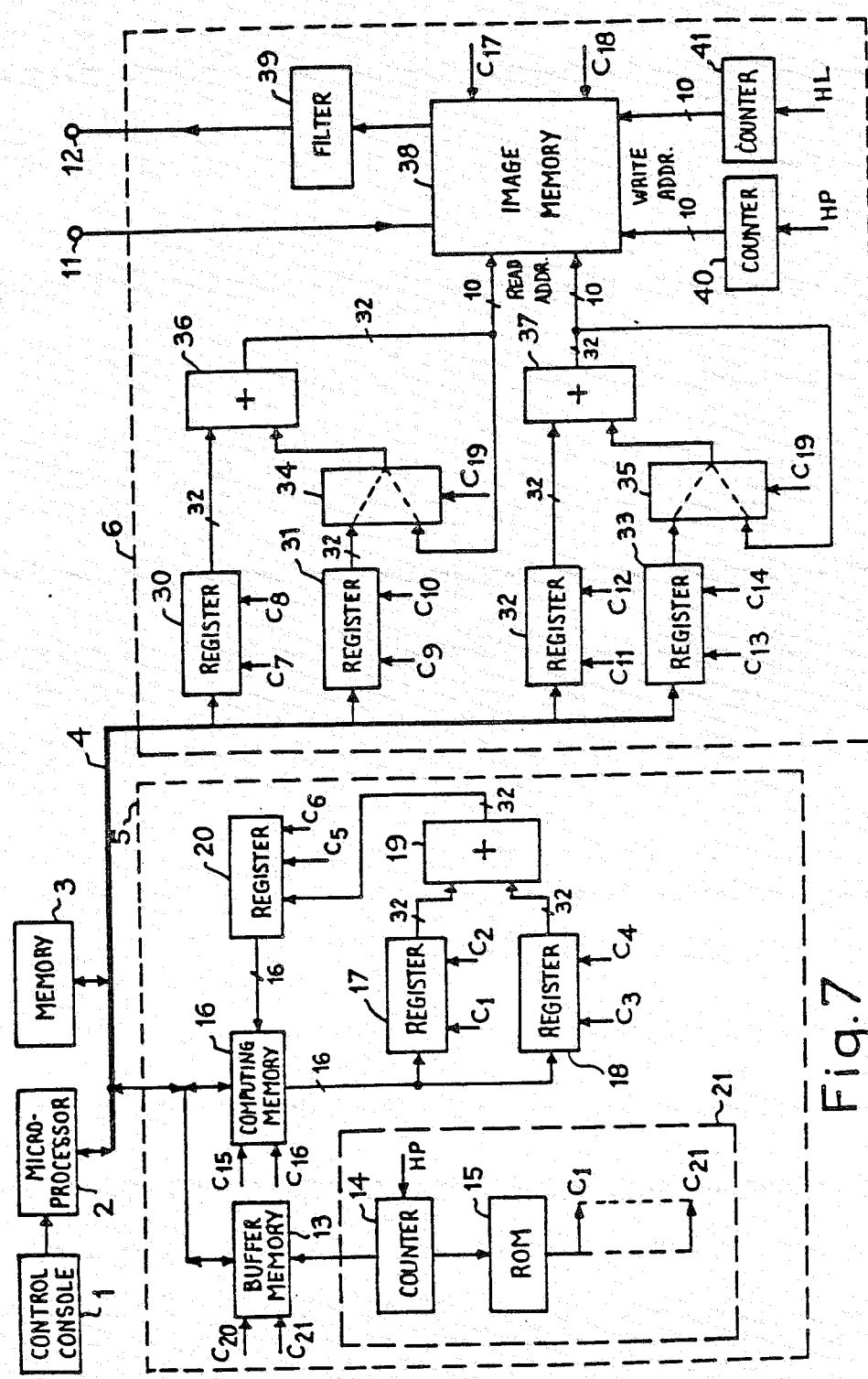
FIG. 7 is a block diagram showing an exemplified embodiment of a device for producing a geometrical transformation on any video image.

FIG. 7 is a block diagram showing one example of construction of a device for carrying out the method in accordance with the invention in order to produce a geometrical transformation on any video image. This example of construction comprises a console 1 which enables an operator to control the device, a microprocessor 2, a memory 3, a data and address bus 4, a device 5 known as a line automaton because it operates at the line scanning frequency, a device 6 known as a point automaton since it operates at the point scanning frequency, an input terminal 11 and an output terminal 12. In the device considered, the microprocessor 2, the memory 3, the line automaton 5 and the point automaton 6 are connected to the bus 4.

The control console 1 is connected to the microprocessor 2. Said microprocessor determines at the field frequency the initialization data which are necessary for operation of the line automaton 5 and the point automaton 6 as a function of the parameters chosen for the transformation, these parameters being stored in the memory 3 which is associated with the microprocessor 2. The memory 3 stores in particular data corresponding to predetermined effects which the operator initiates simply by depressing a key.

The line automaton 5 comprises a buffer memory 13, a computer memory 16, control means 21, three registers 17, 18 and 20, and an adder 19. The buffer memory 13 has a data input and an address input which are connected through the bus 4 to the microprocessor 2, and three inputs connected to the control means 21 for receiving a read address, a read control signal $C_{20}$, and a write control signal $C_{21}$. During each field scanning interval, the microprocessor 2 computes and then writes into the buffer memory 13 data which serve to initialize the automatons 5 and 6 in order to process the following field. These data are the values X(O, O), Y(O, O), $k.D_{xx}$, $k.D_{yy}$, $k.D_{xy}$, and $k.D_{yx}$ computed as a function of the parameters of the desired transformation.

During each field blanking interval, the buffer memory 13 is read at read addresses supplied by the control means 21 and the data which have thus been read are directed by the bus 4 to either to the computing memory 16 or to the point automaton 6. The control means 21 comprise a counter 14 and a read-only memory (ROM) 15. The counter 14 is intremented by a clock signal HP at the frequency of scanning of the points of an image. A first output of the counter 14 delivers an address value to the buffer memory 13 and a second output delivers an address value to a ROM memory 15 which generates control signals $C_1, \ldots, C_{21}$ which control the sequence of operations in the line automaton 5 and in the point automaton 6. During each field blanking interval, the control means 21 initiate reading from the buffer memory 13 of the address value X(O, O), Y(O, O) and of the values of the increments $k.D_{xx}$, $k.D_{yy}$, $k.D_{xy}$, $k.D_{yx}$ which are renewed by the microprocessor 2 within the buffer memory 13 at the field frequency. The computing memory 16 and the adder 19 serve to compute an address value X(O, $Y_3$), Y(O, $Y_3$) at the start of scanning of each line of the transformed image. In order to obtain a sufficient dynamic range and accuracy and taking into account the fact that the computation is a recurrence computation, this operation is performed on 32 bits, namely 22 bits in the case of the whole portion and 10 bits in the case of the fractional portion. X(O, $Y_3$) and Y(O, $Y_3$) are computed successively. The computing memory 16 stores 16-bit words. A data output of the memory 16 is connected to the inputs of the registers 17 and 18 which carry out the conversion of two 16-bit words to a 32-bit word on their respective outputs. These outputs are connected respectively to two inputs of the adder 19 which is a 32-bit adder and the output of this latter is connected to the input of the register 20 which converts the 32-bit word delivered by the adder 19 to a 16-bit word which is applied to a data input of the computing memory 16. The registers 17, 18 and 20 are each controlled by two logical signals delivered by the control means 21 and designated respectively by the references $C_1$ and $C_2$, $C_3$ and $C_4$, $C_5$ and $C_6$. The computing memory 16 receives two control signals $C_{15}$ and $C_{16}$ which control reading and writing in said memory at the line frequency in order to perform computation of the address values $X(O, Y_3)$ and $Y(O, Y_3)$ corresponding to the start of each line of the transformed image. These control signals initiate transmission of said address values to the bus 4 in order to direct them to the point automaton 6.

The point automaton 6 comprises registers 30, 31, 32, 33, multiplexers having two inputs and one output 34 and 35, two adders 36 and 37, two counters 40 and 41, an image memory 38, and a digital filter 39. One input of each register 30, 31, 32, 33 is connected to the bus 4. The outputs of said registers are connected respectively to a first input of the adder 36, to a first input of the multiplexer 34, to a first input of the adder 37 and to a first input of the multiplexer 35. The second input of the adder 36 is connected to the output of the multiplexer 34. The second input of the multiplexer 34 is connected to the output of the adder 36. The second input of the adder 37 is connected to the output of the multiplexer 35. The second input of the multiplexer 35 is connected to the output of the adder 37. The outputs of the adders 36 and 37 are connected respectively to two address inputs of the image memory 38 in order to deliver to said memory a read address $X(X_3, Y_3)$, $Y(X_3, Y_3)$. The counters 40 and 41 are controlled by the clock signals HP and HL at the point scanning frequency and at the line scanning frequency. Said counters have two outputs connected respectively to two inputs of the image memory 38 in order to provide this latter with a write address. The image memory 38 has a write control input for receiving the control signal $C_{17}$, a read control input for receiving a control signal $C_{18}$, a data input connected to an input terminal 11 for receiving the digital values of a video signal corresponding to the initial image, and a data output connected to the input of the filter 39. The output of the filter 39 is connected to an output terminal 12 in order to deliver to this latter the digital values of a video signal corresponding to the transformed image.

The registers 30, 31, 32, 33 are each capable of storing a 32-bit word received in two 16-bit bytes. These registers are controlled respectively by the control signals $C_7$ and $C_8$, $C_9$ and $C_{10}$, $C_{11}$ and $C_{12}$, $C_{13}$ and $C_{14}$ delivered by the control means 21. The register 30 serves to store the increment value $k.D_{xx}$ and the register 31 serves to store the initial value $X(O, Y_3)$. The adder 36 serves to perform an addition on 32 bits. The output of said adder delivers a 32-bit binary word including the bits having weights within the range of $2^{10}$ to $2^{19}$ which constitute an address value $X(X_3 Y_3)$ for reading the image memory 38. The multiplexer 34 transmits the initial value delivered by the output of the register 31 during determination of the value of $X(O, Y_3)$ corresponding to the first point of a line. In the case of all the other points of this line, said multiplexer 34 then transmits the value of $X(X_3-1, Y_3)$ which was the last value to be computed and is available at the output of the adder 36. The adder 37 associated with the registers 32 and 33 and with the multiplexer 35 similarly computes an address value $Y(X_3, Y_3)$ for each point of a line. The image memory 38 therefore receives a read address made up of two 10-bit binary words. Since processing of images is carried out in real time, the image memory 38 is subjected in alternate sequence to a write and a read operation corresponding to one point, each operation being performed at the standard frequency of 13.5 MHz. The write address received by the image memory 10 is constituted by two 10-bit words supplied respectively by the counters 40 and 41. Writing and reading in the image memory 38 are controlled respectively by the control signals $C_{17}$ and $C_{18}$ generated by the ROM 15 of the control memories 21. The digital data delivered by the data output of the image memory 38 are filtered by the digital filter 39, are then applied to the output terminal 12 and constitute the values of the video signal of the transformed image.

The method in accordance with the invention is particularly advantageous for accomplishing geometrical transformations on a video image consisting of a simple geometrical figure such as a figure generated by an electronic shape generator. In the case of the simple figure contemplated in this application, it is not necessary to employ a memory 38 having a capacity equal to an image. The figure can be generated by storing a small quantity of data while employing the method in accordance with the invention for carrying out a geometrical transformation by means of calculations applied to the address values of these data. For example, an initial image consisting of a square as shown in FIG. 2 makes it possible to obtain a transformed image comprising a lozenge having any desired dimensions, any desired position, and even a deformation which produces an effect of perspective. In this example, the figure can be represented by an equation of the form:

$$H(X, Y) = |X| + |Y| = \text{constant}$$

This equation defines a family of squares centered on the origin and each value of the constant corresponds to a different square. Each point of the reference frame O, X, Y belongs either to the interior or to the exterior of a given square, depending on whether the value $H(X, Y)$ is lower than or higher than the value of the constant corresponding to said given square. In order to generate a video signal corresponding to a figure consisting of a square having for example a predetermined color which is different from the background color, it is only necessary to determine each point of the image to be obtained by means of cartesian coordinates $(X_3, Y_3)$ and to compute in respect of each point the value of $H(X, Y)$ as a function of $X_3$ and $Y_3$ by means of the formulae mentioned earlier, then to compare this value with respect to the established constant which determines the square to be obtained. If the computed value is equal to the constant, the point considered belongs to the border of the square. If the computed value is lower than the constant, the point considered belongs to the interior of the square. And if the computed value is higher than the constant, the point considered belongs to the exterior of the square. It is then only necessary to initiate operation of a video signal switcher by means of a logical signal resulting from this comparison.

In order to determine the value of $H(X, Y)$, the values $|X|$ and $|Y|$ are stored respectively in two tables and these latter are addressed respectively by the values X and Y. The storage device is constituted on the one hand by these two tables and on the other hand by an adder for adding the values read respectively from each of these tables. The storage device in this case is therefore not an image memory, but a device which is much less costly since it consists of two tables and an adder.

Figure 8:
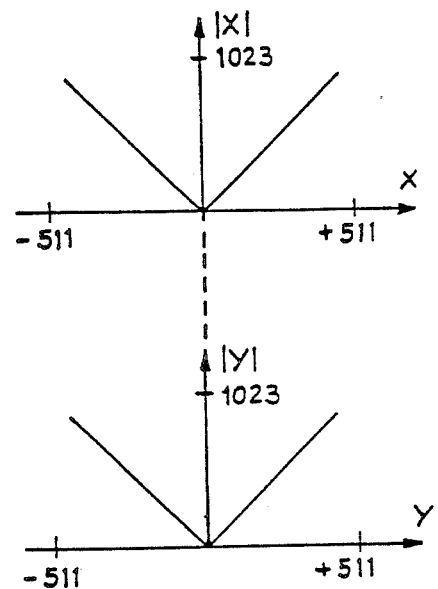

FIG. 8 represents the graphs of the values contained in the tables in one example of construction for generating an initial image consisting of a square. Computations of addresses by means of the formulae mentioned earlier make it possible to obtain a lozenge having any desired dimensions and any desired position as well as a perspective effect if necessary. In FIG. 8, the variables X and Y assume values within the range of −511 to +511, which means that each table stores 1024 words of 10 bits. The dimensions of the lozenge obtained in the transformed image can be modified on the one hand by producing an affine transformation but also by modifying the value of the constant with which the value of $H(X, Y)$ is compared.

In the event that an electronic shape generator is employed in association with a variable-gain switcher in order to obtain an image in which a lozenge-shaped portion, for example, is supplied by a first video signal whereas another portion consisting of the background is supplied by a second video signal, it may be found desirable to produce a blurred transition on the borders of the lozenge.

Figure 9:
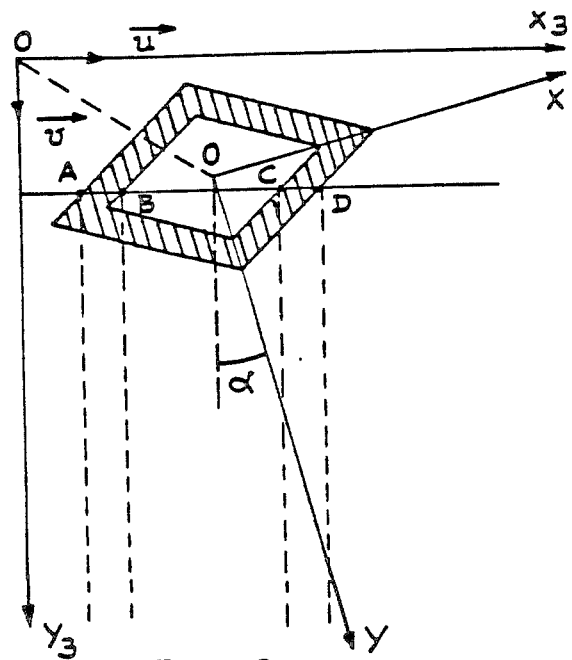
Figure 10:
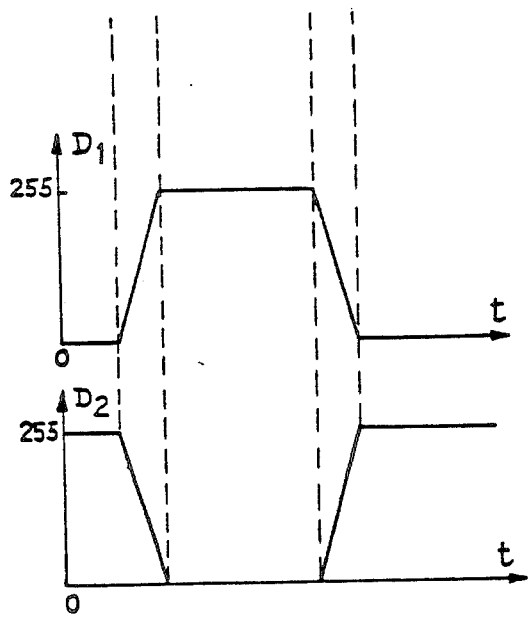
Figure 11:
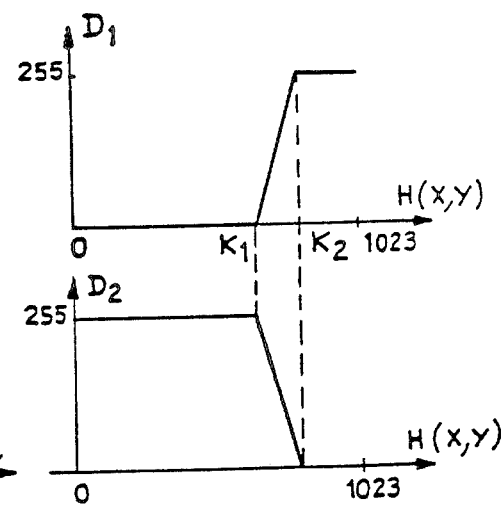

FIG. 9 represents a transformed image corresponding to the example just given. The shaded zone is a blurred zone obtained by adding the two video signals after they have been multiplied respectively by coefficients which vary in inverse ratio. These coefficients are proportional to digital values $D_1$ and $D_2$ supplied by two outputs of the electronic shape generator, these values being represented in FIG. 10 as a function of time and in FIG. 11 as a function of the value $H(X, Y)$. The variations in the values $D_1$ and $D_2$ shown in FIG. 10 correspond to scanning of the line ABCD of the transformed image shown in FIG. 9. The points A, B, C, D are the points of intersection of this line with the boundaries of the blurred zone. While scanning of the segment AB is in progress, the value $D_1$ increases from 0 to 255 whereas the value $D_2$ decreases from 255 to 0 during the same period of time. While scanning of the segment CD is in progress, the value $D_1$ decreases from 255 to 0 whereas the value $D_2$ increases from 0 to 255. When it is not desired to produce a blurred transition, the value of $H(X, Y)$ can be compared with the constant by means of a simple digital comparator. On the other hand, when it is necessary to produce a blurred transition, the comparator is replaced by a memory which supplies two digital values $D_1$ and $D_2$ in accordance with the graphs given in FIG. 11. The size of the lozenge and the width of the blurred border are determined by two constants $K_1$, $K_2$ such that: $0 < K_1 < K_2 < 1023$. When $H(X, Y)$ varies from 0 to 1023, the value $D_1$ remains constant and equal to 0 when $H(X, Y) < K_1$. This value increases linearly to 255 when $H(X, Y)$ varies from $K_1$ to $K_2$ and is then constant when $H(X, Y)$ varies from $K_2$ to 1023. The value D is constant and equal to 255 when $H(X, Y) < K_1$. This value then decreases linearly from 255 to 0 when $H(X, Y)$ varies from $K_1$ to $K_2$, whereupon said value is constant and equal to 0 when $H(X, Y)$ varies from $K_2$ to 1023.

Another effect can be obtained on the border of a figure and this effect consists in surrounding the pattern area formed by the lozenge with a colored border having a predetermined hue. In this case, the electronic shape generator is associated not only with a variable-gain switcher having two channels but also with a switching device for transmitting a video signal corresponding to the desired hue of the border. The electronic shape generator delivers three binary signals to these three switching devices. A first signal assumes the value 0 when $H(X, Y) < K_2$ and the value 255 when $H(X, Y) > K_2$. A second signal assumes the value 255 when $H(X, Y) > K_2$ and assumes the value 0 when this is not the case. Finally, a third signal assumes the value 255 when $K_1 < H(X, Y) < K_2$ and assumes the value 0 when this is not the case. The first signal permits transmission of the video signal corresponding to the background of the transformed image; the second signal permits transmission of the video signal corresponding to the interior of the pattern area; and the third signal permits transmission of the video signal for generating the desired hue of the border. These three signals can be generated either by a combination of digital comparators or by a memory which receives address values consisting of the values $H(X, Y)$ and delivers the three binary signals on a data output.

The method in accordance with the invention for producing a geometrical transformation on a video image consisting of a geometrical figure is generally applicable to any figure which can be stored in a storage device, said device being addressable by the values of coordinates (X, Y) which determine the points of this figure in a cartesian reference frame. The storage of a figure in a device which is addressable by the coordinates X and Y is particularly simple when the equation of the figure can be resolved into a combination of one-dimensional functions as is the case with the equation $H(X, Y) = |X| + |Y|$ =constant. As a general rule, the storage device, which is not an image memory, entails the need for a memory having a much smaller capacity. Said device contains a table of values for each one-dimensional function. Each point $(X_3, Y_3, O)$ considered in the transformed image is represented by a binary word M obtained by reading in the tables the values of the functions which compose the equation at addresses which are functions of the address values X and Y applied to the storage device, then by computing the value of the equation from values read in the tables. This method is particularly simple to put into practice when the equation is of the form $F(X) + G(Y)$ =constant since it calls for the use of only two tables, namely one table which gives the values $F(X)$ as a function of the values of X whereas the other table gives the values of $G(Y)$ as a function of the values of Y. The values supplied by these two tables are added in order to determine the value of the equation and to obtain a value $H(X, Y)$ representing the inclusion or noninclusion of the point having coordinates (X, Y) of the initial image within the interior of the figure, depending on whether this value is lower than or higher than the value given to the constant in the equation which defines the figure.

Figure 12:
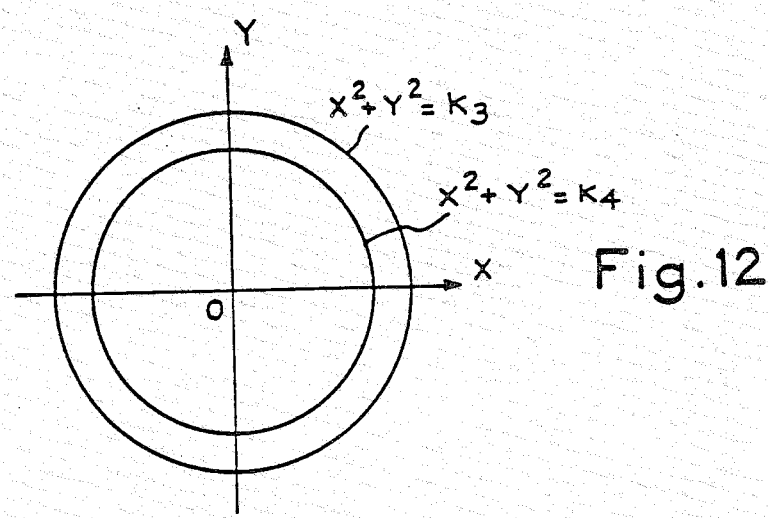

FIG. 12 shows another example of a figure which can be represented by an equation composed of two one-dimensional functions. In this example, the figure constituting the initial image is a circle centered on the origin 0 of the movable reference frame and corresponds to the equation $X^2 + Y^2$ =constant. The geometrical transformations described in the foregoing make it possible to obtain in particular a pattern having the shape of an ellipse or a pattern having the shape of an ellipse deformed by an effect of perspective. In this example, the storage device comprises a memory in which is stored a table of values of $X^2$ as a function of the values of X and a table of the values of $Y^2$ as a function of the values of Y, and an adder.

Figure 13:
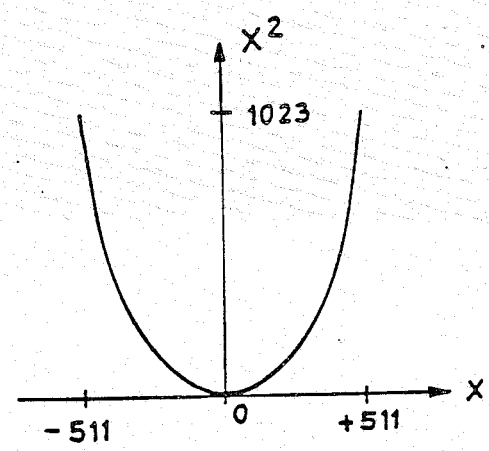
Figure 14:
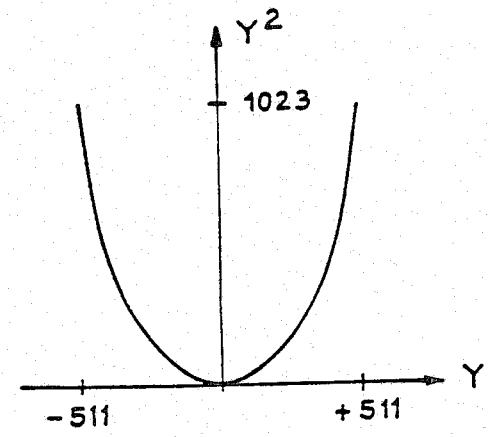

FIGS. 13 and 14 represent the graphs of the values contained in the two tables of the storage device for generating any desired circle irrespective of its diameter. The values X and Y vary between −511 and +511 whereas $X^2$ and $Y^2$ assume values within the range of 0 to 1023. The number of stored values is equal to 1024 in each of the tables, thus making it possible to generate a pattern whose edges have a highly uniform appearance. If the value $X^2 + Y^2$ is compared with constants $K_3$ and $K_4$ such that $K_3 \neq K_4$, the two corresponding figures are circles centered on 0 and having different radii. In this example, the value of the constant which defines the circle must be chosen so as to be close to 1023 in order to gain the benefit of higher uniformity of outline, a reduction in size of the circle being always possible by producing an affine transformation having a ratio which is smaller than 1. It would be possible to retain an affinity ratio equal to 1 and to reduce the size of the circle by adopting a low value for the constant with which the value of the equation is compared but, in that case, the figure thus obtained would be less uniform. Stairstep discontinuities would be more readily visible on the transformed image since the parabolas constituting the graphs of $X^2$ and $Y^2$ have a low slope in the vicinity of low values.

Figure 15:
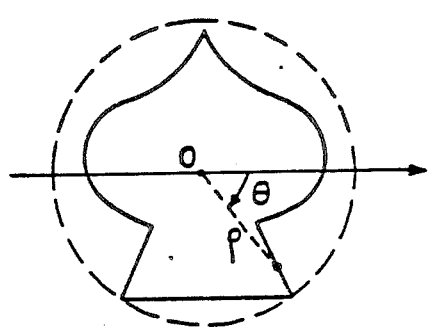
Figure 16:
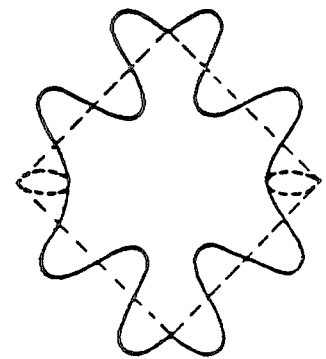

Certain figures do not have simple equations in cartesian coordinates and yet can readily be represented in polar coordinates ($\rho$, $\theta$). Examples of such figures are the ace of spades or a lozenge having sinusoidal sides as shown respectively in FIGS. 15 and 16. The ace of spades can be considered as a circle modulated by a function of the angle $\theta$ whereas the lozenge having sides formed by sine waves having a period equal to twice the length of one side can be considered as a square having sides modulated by an orthogonal curve which is in fact a sine wave in this instance.

Broadly speaking, a geometrical figure which can be represented in polar coordinates ($\rho$, $\theta$) by an equation of the form $\rho(\theta).(1 + g(\theta)) = $ constant can be considered as a circle whose radius is modulated by a function of $\theta$. The method of storage of the figure consists in storing seven tables containing respectively: the values of $X^2$, $Y^2$, $-\log X$, $\log Y$, as a function of (X, Y), the values of $\rho = \sqrt{X^2 + Y^2}$ as a function of $X^2 + Y^2$, the values of $\theta = \text{Arctg } Y/X$ as a function of Log X and of Log Y, and the values of $g(\theta)$ as a function of $\theta$. The method further consists in determining a binary word M by reading from the tables $X^2$, $Y^2$, Log X, Log Y, then by computing $X^2 + Y^2$ and Log Y $-$ Log X, then by reading from the tables the value of $\rho = \sqrt{X^2 + Y^2}$ and $\theta = $ Arctg Y/X, then by reading from the tables $g(\theta)$, then by computing $\rho(\theta).(1 + g(\theta))$. The value obtained is compared with respect to a constant which defines the size of the figure. If the value obtained is lower than the constant, the point having coordinates (X, Y) of the initial image is located inside the figure whereas it is located outside in the case of a higher value.

Similarly, it may be stated in general terms that a geometrical figure which can be represented by an equation of the form $(|X| + |Y|).(1 + h(|X| - |Y|)) = $ constant in cartesian coordinates (X, Y) can be considered as a figure deduced from a square by a modulation of the sides by an orthogonal curve. The method of storage of the figure accordingly consists in storing it in the form of seven tables containing respectively the values of $|X|$ as a function of the values of X, the values of $-|Y|$ as a function of the values of Y, and the values of $h(|H| - |Y|)$ as a function of the values of $(|X| - |Y|)$. The method further consists in restituting a predetermined binary word M in respect of each point of the initial image having coordinates (X, Y) by reading the values $|X|, |Y|, -|Y|$ in the tables, then by computing $|X| + |Y|$ and $|X| - |Y|$, then by reading $h(X-Y)$ in the tables, then by computing:

$$M = (X + Y)(1 + h(|X| - |Y|))$$

This value is then compared with the constant of the equation which defines the figure, the point (X, Y) being located inside the figure if the value of M is lower than the constant and being located outside the figure if the value M is higher than the constant.

These two methods of storage make it possible to produce very different figures by employing storage means comprising numerical tables which require a low memory capacity and comprise arithmetical operators: adders, subtracters, multipliers. A storage device of this type is in any case much less costly than an image memory.

Figure 17:
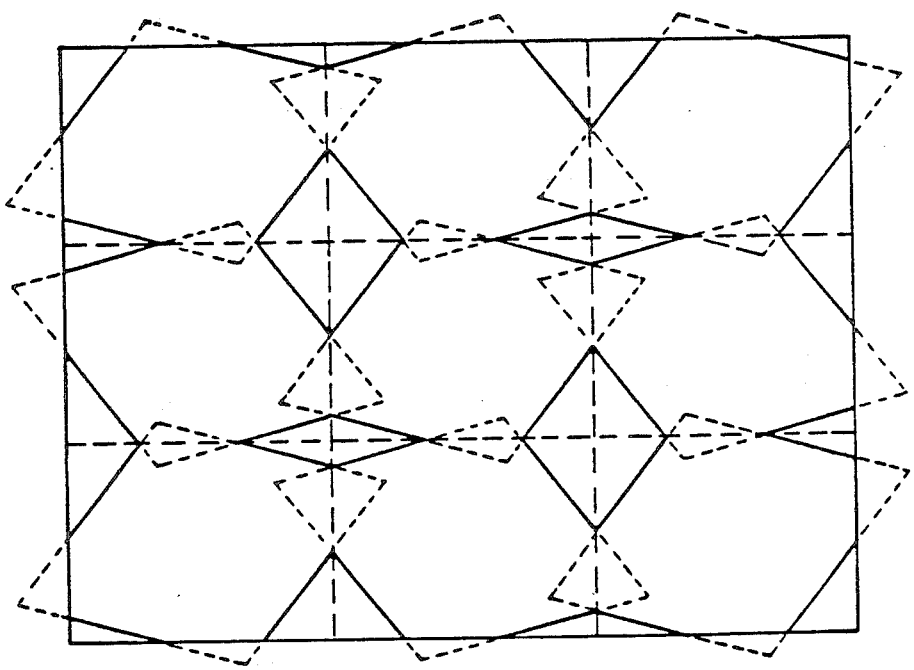

In the event that the geometrical transformation accomplished by means of the method in accordance with the invention is applied to an image generated by an electronic shape generator, a particularly interesting and useful effect is the multiplication of patterns with or without mirror effect. FIG. 17 represents a transformed image obtained by multiplying a pattern three times horizontally and three times vertically. Each duplication of the pattern is achieved with a mirror effect, that is to say a symmetry with respect to one axis.

In order to produce an effect of horizontal multiplication of the initial image in the transformed image without a mirror effect, the method consists in reinitializing the value of the read address X and Y periodically during each line scan of the transformed image instead of continuing to apply the recurrence formulae (15) along the entire line. Reinitialization is carried out with values given by the formulae (16) exactly as in the case of the first point of the line. In this example, in order to obtain a multiplication by three in the horizontal direction, initialization of the value of X and Y must be performed at a frequency equal to three times the line scanning frequency.

In order to perform a vertical multiplication without mirror effect, the value of X and of Y is initialized periodically during a field scan by the values computed in accordance with the formulae (17) as in the case of the first point of a field. In this example of vertical multiplication by three, the frequency of these reinitializations in accordance with the formulae (17) is equal to three times the field frequency.

In order to obtain a mirror effect in addition to multiplication, the sign of the increments $D_{xx}$ and $D_{yx}$ is reversed at the time of each reinitialization by the values given by the formulae (16) in order to obtain symmetries with respect to vertical axes and the sign of the increments $D_{yy}$ and $D_{xy}$ is reversed at the time of each reinitialization with the values given by the formulae (17) in order to obtain symmetries with respect to horizontal axes.

Figure 18:
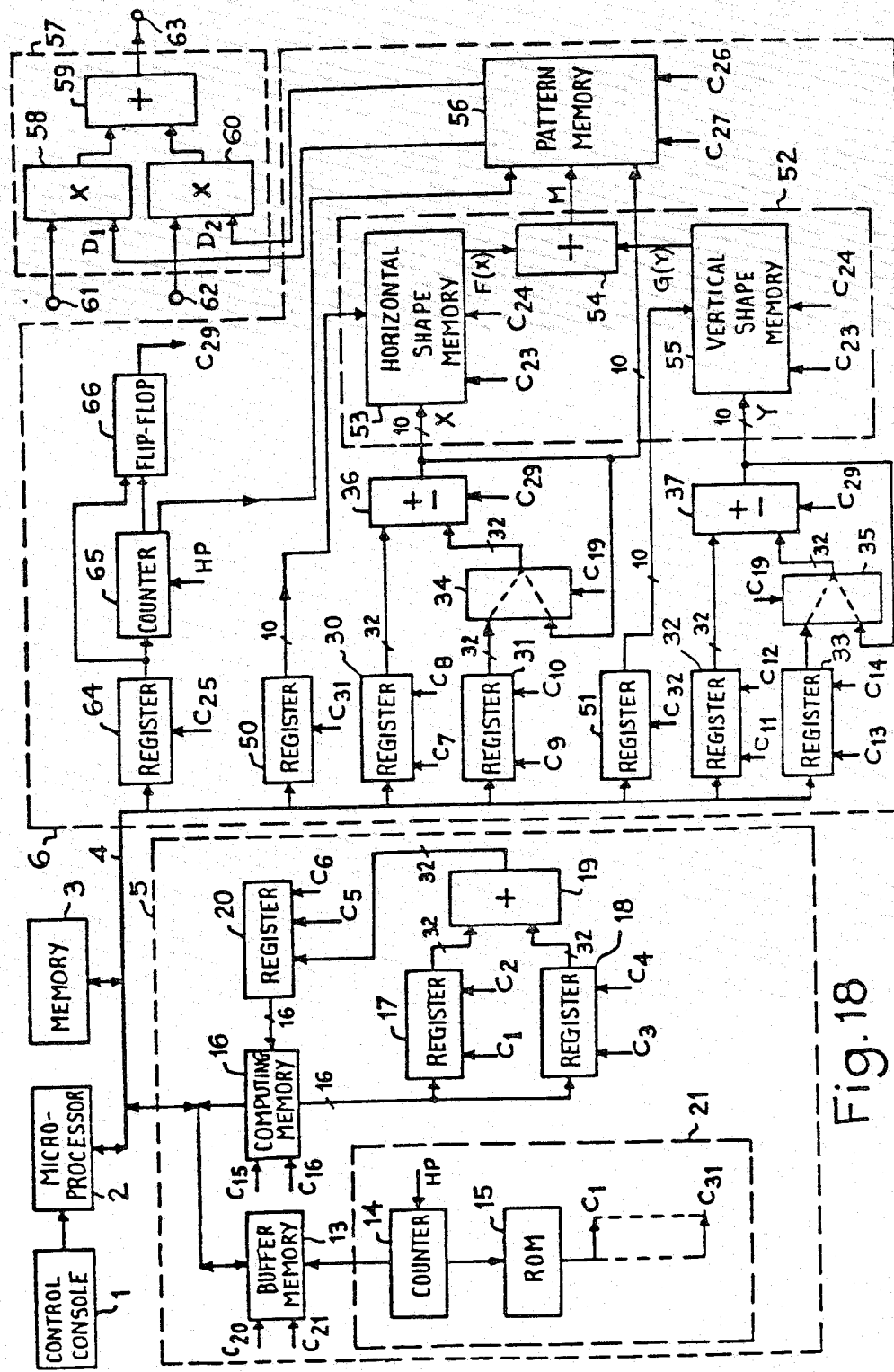
FIG. 18 is a block diagram showing an exemplified embodiment of a shape-generating device.

FIG. 18 is a block diagram showing an exemplified embodiment of an electronic shape generator associated with a variable-gain video switcher for carrying out the method in accordance with the invention in order to produce geometrical transformations on the shapes which are generated. A portion of this shape generator is similar to a portion of the exemplified embodiment illustrated in FIG. 7. Similar elements are designated by the same numerical reference but followed by the prime index '. This similar portion is constituted by a control console 1', a microprocessor 2', a memory 3', a data and address bus 4', and a line automaton 5'. In this example of construction of a shape generator, the control means 21' generate control operations $C'_1 \ldots C'_{28}$ which are more numerous than in the case of the device for producing a transformation on any image stored in an image memory. This example of construction further comprises a point automaton 6' and a variable-gain video switcher 57. The point automaton 6' comprises certain elements which are similar to those of the point automaton 6 of the example of construction shown in FIG. 7. These similar elements are designated by the same reference numeral but followed by the prime index '.

The variable-gain video switcher 57 is constituted by two multipliers 58 and 60, and by an adder 59. Said switcher receives on input terminals 61 and 62 two series of numerical (digital) values corresponding to two video signals and delivers on an output terminal 63 a series of numerical values of a video signal corresponding to an image constituted by part of the image provided by the first video signal and by part of the image provided by the second video signal. The first video signal is applied to the first input of the multiplier 58 which receives a numerical value $D_1$ on a second input. The second video signal is applied to a first input of the multiplier 60 which receives on a second input a numerical value $D_2$. The values supplied by the outputs of the multipliers 58 and 60 are added by the adder 59 and the resultant values constitute the values delivered to the output terminal 63.

The point automaton 6' comprises seven registers 64, 50, 30', 31', 51, 32', 33', a counter 65, a flip-flop 66, two multiplexers 34' and 35', two adder-subtracters 36' and 37', a device 52 for storing a figure and a memory 56 known as a pattern memory. In this example, the figure can be represented by an equation of the form $F(X)+G(Y)=$ constant. The storage device 52 consists of a random-access memory (RAM) 53 or so-called horizontal shape memory for storing the values of $F(X)$ as a function of the values of X, a random-access memory (RAM) 55 or so-called vertical shape memory for storing the values of $G(Y)$ as a function of the values of Y, and an adder 54. All the registers have one input connected to the data and address bus 4'. One output of the register 64 is connected to control and initialization inputs of the counter 65 and of the flip-flop 66. A control input of said register receives a control signal $C'_{25}$ delivered by the control means 21 of the line automaton 5'. The counter 65 has a clock input which receives a clock signal HP' at the point scanning frequency and has an output connected to a control input of the flip-flop 66. Said flip-flop 66 behaves as a scale-of-two frequency divider and delivers a control signal $C'_{19}$ to a control input of the adder-subtracter 36' and to a control input of the adder-subtracter 37'. The register 50 has a control input for receiving a signal $C'_{31}$ delivered by the control means 21 and an output for supplying a ten-bit binary word to a data input of the horizontal shape memory 53. The register 51 has a control input for receiving a control signal $C'_{32}$ delivered by the control means 21 and an output for supplying a ten-bit binary word to a data input of the vertical shape memory 55. The register 30' has two control inputs for receiving control signals $C'_7$ and $C'_8$ delivered by the control means 21 and has an output for supplying a 32-bit binary word to a first input of the adder-subtracter 36'. The register 31' has two control inputs for receiving control signals $C'_9$ and $C'_{10}$ and has an output for supplying a 32-bit binary word to a first input of the multiplexer 34'. A second input of the multiplexer 34' is connected to the output of the adder-subtracter 36' and its output is connected to a second input of said adder-subtracter. The multiplexers 34' and 35' are controlled by a control signal $C'_{19}$ delivered by the control means 21.

The register 32' is controlled by control signals $C'_{11}$ and $C'_{12}$ and has an output for supplying a 32-bit binary word to a first input of the adder-subtracter 37'. The register 33' is controlled by control signals $C'_{13}$ and $C'_{14}$ and has an output for supplying a 32-bit binary word to a first input of the multiplexer 35'. The multiplexer 35' has a second input connected to the output of the adder-subtracter 37' and an output for supplying a 32-bit binary word to the second input of the adder-subtracter 37'.

The operation of the adder-subtracters 36' and 37' either as adders or as subtracters is controlled by the control signal $C'_{29}$ delivered by the flip-flop 66. The output of the adder-subtracter 36' supplies a 10-bit binary word to a read/write address input of the horizontal shape memory 53. The output of the adder-subtracter 37' supplies a 10-bit binary word to a read/write address input of the vertical shape memory 55. These ten bits are constituted by bits having weights within the range of $2^{10}$ to $2^{19}$ among the 32 bits delivered by the output of the adder-subtracters 36' and 37'.

Reading and writing in the horizontal shape memory 53 and in the vertical shape memory 55 are controlled respectively by control signals $C'_{23}$ and $C'_{24}$. A data output of the memory 53 and a data output of the memory 55 are connected respectively to a first and a second input of the adder 54. The output of the adder 54 constitutes the output of the storage device 52 and supplies a binary word M. The binary word M is applied to a read address input of the pattern memory 56. The memory 56 also has a data input and a write address input which are connected respectively to the output of the adder-subtracter 36' and to the output of the counter 65, and two control inputs respectively for writing and for reading which receive control signals $C'_{27}$ and $C'_{26}$ delivered by the control means 21.

The control console 1' of the shape-generating device makes it possible to control a large number of effects and a large number of parameters for each effect: the number of the effect, its size, the horizontal framing, the vertical framing, the vertical or horizontal compression (packing) ratio, the angle of rotation, the width of a blurred border, the number of horizontal repetitions, the number of vertical repetitions, the mirror effect, the perspective effect, and so on. A microprocessor incorporated in the control console 1' transmits these parameters to the microprocessor 2' of the shape generator and the microprocessor 2' stores these parameters in the memory 3' and calls-up a program module for performing the initializations which are specific to the required effect. These initializations involve in particular the loading of the horizontal shape memory 53 and of the vertical shape memory 55. The data of memories 53 and 55 are stored in library form in the memory 3' since they are invariable in respect of a given effect. The microprocessor 2' computes initialization data enabling the point automaton 6' to compute the data of the pattern memory 56 as a function of the width of the border which is to be formed and which may be blurred. All these data are written into the buffer memory 13' of the line automaton 5' during each field scan under the control of the microprocessor 2'. During each field blanking interval, these data are transferred via the bus 4' of the buffer memory 13' to the registers 64, 50, 30', 31', 51, 32', 33'. Moreover, the buffer memory 13' delivers data for initialization of the line automaton 5', these data being loaded into the computing memory 16'. Said initialization data are the address value X (O, O), Y (O, O), the values of the increments $k.D_{xy}$ and $k.D_{yy}$, the values of the addresses (X, Y) for the mirror effect or the repetition effect.

Reading of the buffer memory 13' is carried out during each field blanking interval at an address supplied by the output of the counter 14' under the control of the control signal $C'_{21}$ delivered by the control means 21.

In the first place, the control means 21 effect the transfer from the buffer memory 13' to the register 30' and the data register 31' for enabling the adder-subtracter 36' to compute the data to be loaded into the pattern memory 56 in order to obtain a pattern having the desired size and having a blurred border of the desired width. By way of example, the computed values are those given by the graphs in FIG. 11. At the beginning of this computation, the multiplexer 34' connects the output of the register 31' to the second input of the adder-subtracter 36', whereupon the multiplexer 34' connects the output of the adder-subtracter 36' to its second input under the control of the signal $C'_{19}$ delivered by the control means 21.

Furthermore, the control means 21 initiate the transfer of data defining the shape of the pattern to be formed from the buffer memory 13' to the horizontal shape memory 53 and the vertical shape memory 55. These data are transferred respectively via the register 50 and via the register 51, then written into the memories 53 and 55 at addresses supplied respectively by the adder-subtracters 36' and 37' which compute a series of addresses within the range of 0 to 1023 from an initial value 0 stored in the register 31' and in the register 33' and from an increment value equal to unity stored in the register 30' and in the register 32'. At the beginning of this computing operation, the multiplexers 34' and 35' are switched in order to connect respectively the register 31' and the register 33' to the second input of the adder-subtracter 36' and to the second input of the adder-subtracter 37'.

Values of increments $k.D_{xx}$ and $k.D_{yy}$ are then transferred by the control means 21 from the buffer memory 13' to the registers 30' and 32' and values of addresses X(O, Y$_3$) and Y(O, Y$_3$) corresponding to the first point of the next field of the transformed image are transferred by said control means from said buffer memory to the registers 31' and 33'.

During each line blanking interval, the control means 21 control the computing memory 16' and the registers 17', 18', 20' in order to compute the addresses corresponding to the first point of the following line. These address values are stored in the computing memory 16', then transmitted to the registers 30' and 32' via the bus 4'.

In this example of construction, the storage means 52 make it possible to generate shapes described by an equation of the form H(X, Y)=F(X)+G(Y). The binary word M supplied by the output of the adder 54 has the value H(X, Y). The pattern memory 56 is designed to deliver two control signals having values $D_1$ and $D_2$ for the purpose of forming blurred borders. Adaptation of the pattern memory to the formation of a colored border in accordance with the method set forth in the foregoing is within the capacity of any one versed in the art.

In this example, provision is made for the possibility of producing a multiplication of patterns with or without a mirror effect. The control means 21 carry out the loading of a binary word into the register 64 in order to control and initialize the counter 65 and the flip-flop 66 and thus to deliver a clock signal to the flip-flop 66 at the instants corresponding to the start of a pattern scan on each line. The flip-flop 66 then permits generation of the control signal C' which produces in alternate sequence an incrementation and a decrementation of the addresses supplied by the adder-subtracters 36' and 37' in order to obtain the mirror effect. In the event that the mirror effect is not desired, one output of the register 64 delivers to an inhibition input of the flip-flop 66 a signal for maintaining the control signal C' at a predetermined value which causes the adder-subtracters 36' and 37' to operate as adders.

Figure 19:
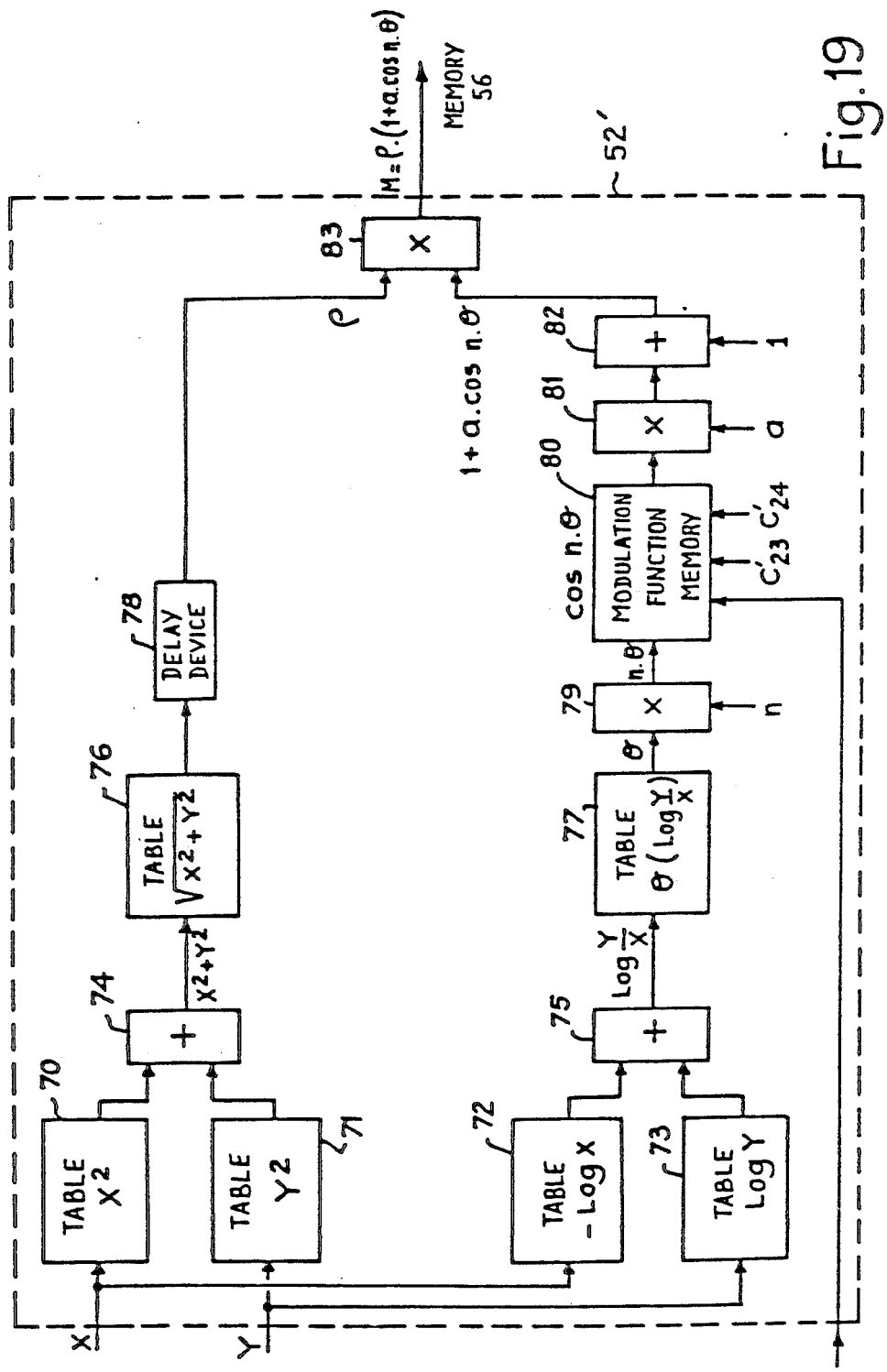
FIGS. 19 and 20 illustrate two variants of a portion of said shape-generating device.

FIG. 19 shows a variant 52' of the device 52 for storage of the initial image in order to generate a figure obtained by modulating the shape of a circle by a sine wave. In this example, an output of the device 52' supplies a binary word M whose value is equal to $\theta.(1+a.\cos n.\theta)$ when this device is addressed by address values X and Y. This device 52' comprises six random-access memories 70, 71, 72, 73, 76 and 77 for storing the tables of the functions $X^2$, $Y^2$, $-\log X$, $-\log Y$, $\sqrt{X^2+Y^2}$ and $\theta$ (Log Y/X), a random-access memory 80, three adders 74, 75 and 82, a delay device 78 and three multipliers 79, 81 and 83. The memories 70 and 72 receive a read address value consisting of the value X. The memories 71 and 73 receive a read address value consisting of the value Y. The memories 70 and 71 deliver respectively the values $X^2$ and $Y^2$ which are then added by the adder 74. The memories 72 and 73 deliver respectively a value $-\log X$ and a value Log Y which are then added by the adder 75. The read-only memory (ROM) 76 receives a read address value consisting of the value $X^2+Y^2$ delivered by the output of the adder 74 and the read-only memory (ROM) 77 receives a read address value consisting of the value Log Y/X delivered by the output of the adder 75. The output of the ROM 76 delivers a value $\rho=\sqrt{X^2+Y^2}$ to the delay device 78 which retransmits this value to a first input of the multiplier 83. The output of the ROM 77 delivers a value $\theta=\text{Arctg } Y/X$ corresponding to the value of Log Y/X to a first input of the multiplier 79. This latter receives an integral value n on a second input and delivers a value $n\theta$ at its output. The value $n\theta$ constitutes a read address for the random-access memory (RAM) 80. Said memory 80 is designated as a modulation function memory since it is previously loaded by the values of a function which is intended to modulate the shape of a circle. These values are loaded via a data input connected to the output of the register 50. Writing into and reading from the memory 80 are controlled respectively by the signal $C'_{23}$ and the signal $C'_{24}$ delivered by the control means 21 as in the case of the variant shown in FIG. 18. A data output of the memory 80 supplies a value $\cos n\theta$ to a first input of the multiplier 81 which receives a constant a on a second input. The constant a determines the amplitude of modulation applied to the circle whereas the constant n determines the number of visible alternations on the modulated circle.

The output of the multiplier 81 supplies a value $a.\cos n\theta$ to a first input of the adder 82 which receives on a second input a constant value equal to unity. The output of the adder 82 therefore supplies a value $1+a.\cos n\theta$ to the second input of the multiplier 83. This latter delivers to a read address input of the pattern memory 56 a binary word M whose value is $\rho.(1+a.\cos n\theta)$.

Figure 20:
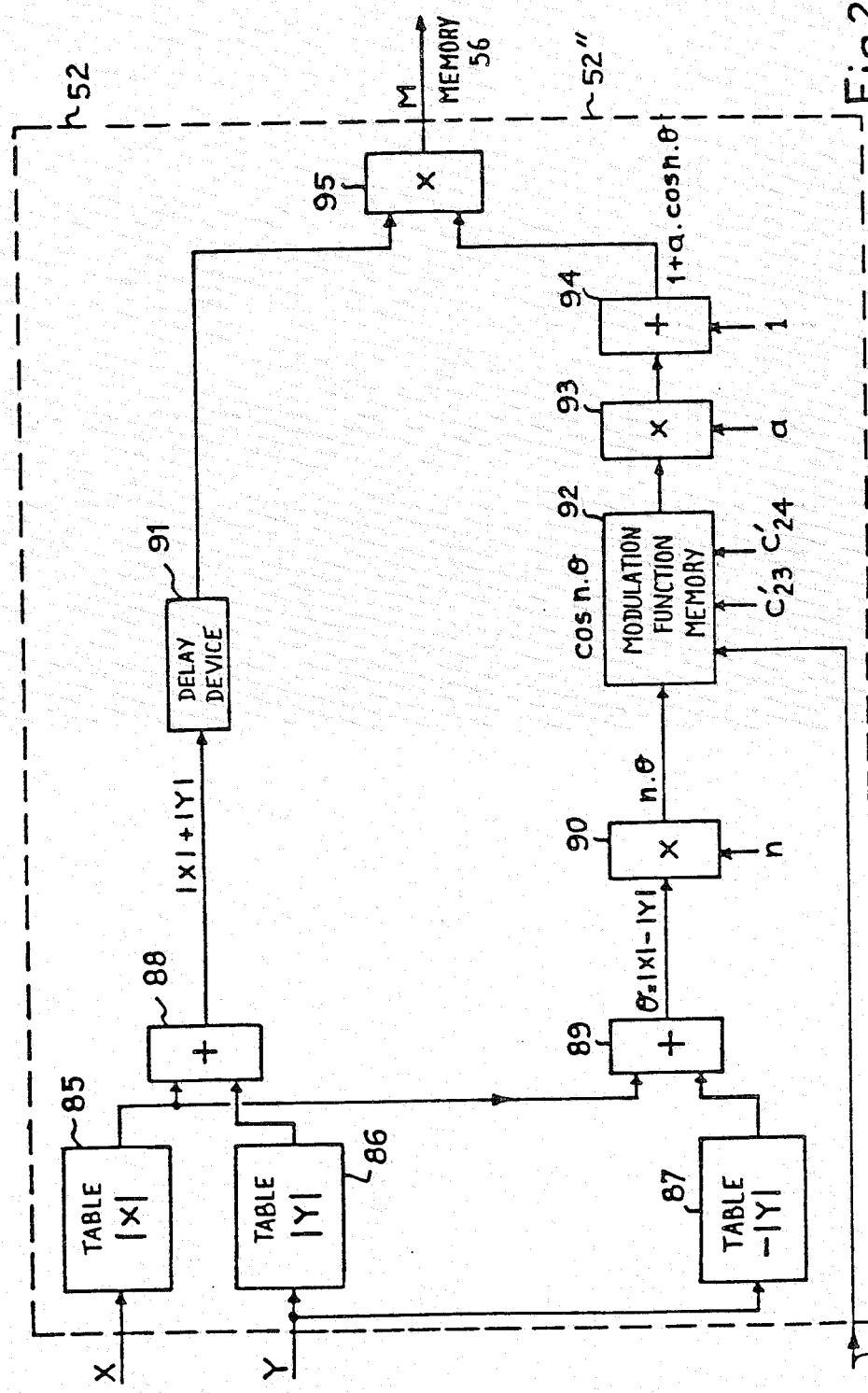

FIG. 20 represents a third variant 52" of the device 52 of FIG. 18 which is adapted to generate a figure obtained by modulation of a square. In this example, the figure is described by an equation of the form:

$$(|X|+|Y|).(1+a\cos.n(|X|-|Y|))=\text{constant}$$

The device 52" comprises three random-access memories 85, 86 and 87 which store respectively the tables of the values $|X|$, $|Y|$ and $-|Y|$, three adders 88, 89 and 94, a delay device 91, three multipliers 90, 93 and 95, and a random-access memory 92. The memory 85 receives a read address value consisting of the value X. The memories 86 and 87 receive a read address value consisting of the value Y. The data outputs of the memory 85 and of the memory 86 are connected respectively to the first and to the second input of the adder 88 which therefore delivers a value $|X|+|Y|$ at its output. The output of the memory 87 is connected to a first input of the adder 89, a second input of which is connected to the data output of the memory 85. The output of the adder 89 therefore supplies a value $\theta=|X|-|Y|$. The value $\theta$ is applied to a first input of the multiplier 90 which receives on a second input a constant integral value n. This value determines the number of alternations which modulate each side of the square. The output of the multiplier 90 supplies a value $n.\theta$ to a read address input of the random-access memory 92. This memory 92 is designated as a modulation function memory since it stores a table of the values of the function $\cos n\theta$ as a function of $n\theta$. These values are loaded at the time of initialization during the field blanking interval by means of the register 50 and under the control of the write control signal $C'_{23}$. The value of $\cos n\theta$ is read from the memory 92 at the address $n\theta$ under the action of the control signal $C'_{24}$ and is then delivered to a first input of the multiplier 93. A second input of the multiplier 93 receives a constant value a which determines the amplitude of the modulation applied to the square. The output of the multiplier 93 delivers a value $a.\cos n\theta$ to a first input of the adder 94 which receives a constant value equal to unity on a second input. The output of the adder 94 delivers a value $1+a.\cos n\theta$ to a first input of the multiplier 95. A second input of the multiplier 95 receives the value $|X|+|Y|$ delayed by the delay device 91 in order to compensate for the computing times of the multipliers 90, 93, of the memory 92 and of the adder 94. The output of the adder 95 supplies a binary word M whose value is equal to:

$$(|X|+|Y|).(1+a\cos.n(|X|-|Y|)).$$

The invention is not limited to the examples of construction described in the foregoing. It is possible in particular to construct electronic shape generators comprising a plurality of point automatons 6 designed in accordance with the three alternative embodiments described above and having outputs coupled by means of digital comparators. This in turn offers the possibility of combining the control signals for operating the variable-gain switchers in order to obtain two control signals for operating a variable-gain switcher. In consequence, the figures generated by the different point automatons of the shape generator can be superimposed in one and the same image.

Moreover, the invention is not limited to figures which can be represented by equations of the form $F(X)+G(Y)=\text{constant}$ or which are deduced from a circle or a square by a modulation. Thus the invention is in fact applicable to all figures which can be stored in a storage device, the address values of which are constituted by the coordinates of the points of an initial image in a cartesian reference frame.

What is claimed is:

1. A method for producing a geometrical transformation on a video image designated as an initial image, comprising the steps of:

identifying each point of the initial image by a plurality of first coordinates (X, Y, O) in a first cartesian reference frame which is designated as a movable reference frame and is related to the initial image;

representing each point of the initial image by a digital word;

storing the digital words representing each point of the initial image at a plurality of addressable locations in a storage device having address inputs and a data output, so that a digital word corresponding to the each point and having coordinates (X, Y, O) in the initial image is delivered when address values corresponding to the each point are applied to the storage device address inputs;

performing a transformation of the initial image using predetermined tranformation parameters to yield a transformed image;

identifying each point of the transformed image by a plurality of second coordinates ($X_3$, $Y_3$, O) in a second cartesian reference frame which is related to the transformed image and is designated as a fixed reference frame;

determining a relationship between the second coordinates and the first coordinates, based on the transformation parameters and calculating one computed address value; and representing each point of the transformed image by a digital word supplied from the storage device by applying computed address values to the address inputs of said storage device, said computed values being computed as a sum of the computed address value of second coordinates ($X_3$, $Y_3$, O) of said point and, an increment value.

2. A method of transformation according to claim 1, wherein the geometrical transformation is an affine transformation having coefficients ($A_x$, $A_y$) and includes a rotation through an angle $a$, both transformations being performed in the plane of the initial image, said transformation also including a projection in perspective on the plane of the transformed image, this projection being defined by a direction of view and a vanishing point, said direction of view being defined by two predetermined angular values $\beta$ and $\gamma$ and said vanishing point of said projection being located at a distance $\rho_{PF}$ from the origin of the fixed reference frame, said origin being the first point of the first line of the transformed image, and said transformation further including a translation ($X_{O3}$, $Y_{O3}$) in the plane of the transformed image, comprising the further steps of:

computing the read addresses as a function of those computed in the immediately preceding point in the transformed image when the each point in the transformed image has coordinates ($X_3>O$, $Y_3 O, O$) said computing being in accordance with the formulae:

$$X(X_3, Y_3) = X(X_3 - 1, Y_3) + k D_{xx}$$

$$Y(X_3, Y_3) = Y(X_3 - 1, Y_3) + k D_{yx} \quad (15)$$

initializing values of the each point having coordinates ($X_3 = O$, $Y_3 > O, O$) and which are located at the beginning of a line of the transformed image by the values:

$$X(O, Y_3) = X(O, Y_3 - 1) + k D_{xy}$$

$$Y(O, Y_3) = Y(O, Y_3 - 1) + k D_{yy} \quad (16)$$

where $X(O, Y_3-1)$, $Y(O, Y_3-1)$ being the read address values computed in respect of the first point of the immediately preceding line in the transformed image; and calculating the first point of the transformed image ($X_3 = O$, $Y_3 = O$) according to the relation:

$$X(0,0) = -k \cdot D_{xx} \cdot X_{03} - k \cdot D_{xy} \cdot Y_{03}$$

$$X(0,0) = -k \cdot D_{yx} \cdot X_{03} - k \cdot D_{yy} \cdot Y_{03} \quad (17)$$

with:

$$k = 1 - k_x(X_3 - X_{03}) + k_y(Y_3 - Y_{03}) \quad (18)$$

$$D_{xx} = \frac{\cos\alpha \cos\beta \cos\gamma + \sin\alpha \cos\beta}{A_x}$$

$$D_{xy} = \frac{\cos\alpha \sin\beta \cos\gamma + \sin\alpha \cos\beta}{A_x}$$

$$D_{yx} = \frac{\sin\alpha \cos\beta \cos\gamma + \cos\alpha \sin\beta}{A_y}$$

$$D_{yy} = \frac{\sin\alpha \sin\beta \cos\gamma + \cos\alpha \cos\beta}{A_y}$$

$$k_x = \frac{\cos\beta \sin\gamma}{PPF}$$

$$k_y = \frac{\sin\beta \cos\gamma}{PPF}$$

3. A method according to claim 2, wherein the vanishing point is assumed to be located at infinity, and wherein k=1.

4. A method according to claim 3 for producing an effect of multiplication of the initial image in addition to the geometrical transformation in the transformed image, wherein said method comprises the further steps of:

periodically reinitializing the value of (X, Y) in accordance with the formulae:

$$X(O, Y_3) = X(O, Y_3 - 1) + k D_{xy}$$

$$Y(O, Y_3) = Y(O, Y_3 - 1) + k D_{yy} \quad (16)$$

during each transformed-image line scan, with a period being a submultiple of the line scanning interval;

periodically reinitializing the value of (X, Y) in accordance with the formulae:

$$X(O,O) = -k D_{xx} X_{O3} - k D_{xy} Y_{O3}$$

$$X(O,O) = -k D_{yx} X_{O3} - k D_{yy} Y_{O3} \quad (17)$$

during each transformed-image field scan, with a period being longer than the duration of one line scan and being a submultiple of the field scanning interval.

5. A method according to claim 4 for producing a mirror effect in addition to the geometrical transformation and the multiplication effect, and comprising the further steps of:

reversing the sign of $D_{xx}$ and $D_{yx}$ at the time of each reinitialization of (X, Y) with the values given by the formulae:

$$X(O, Y_3) = X(O, Y_3 - 1) + k D_{xy}$$

$$Y(O, Y_3) = Y(O, Y_3 - 1) + k D_{yy} \quad (16)$$

in order to obtain symmetries with respect to vertical axes;

reversing the sign of $D_{yy}$ and $D_{xy}$ at the time of each reinitialization of (X, Y) with the values given by the formula $$X(0,0) = -k D_{xx} X_{03} - k D_{xy} Y_{03}$$

$$X(0,0) = -k D_{yx} X_{03} - k D_{yy} Y_{03} \quad (17)$$

in order to obtain symmetries with respect to horizontal axes.

6. A method for producing a geometrical transformation of an initial video image, comprising the steps of:

identifying each point of the video image by a first address in a first coordinate system;

storino a digital word representing characteristics with each point in the video image at the first address;

performing a transformation of the original image using predetermined transformation parameters to yield a transformed image;

identifying each point in the transformed image by a second address in a second coordinate system;

computing a value of an initial point in the transformed image;

determining a first recurrence, which when added to a value of an adjacent point yields a value of a current point;

determining each value of each point from the value of an adjacent point; and using such value as an address to access the stored digital word representing the characteristics of each point.

7. A method as in claim 6 wherein said determining a recurrence step includes the steps of:

determining a first recurrence between any point and a point adjacent to such any point on a same line; and determining a second recurrence between a point at the end of one line and a point on another line.

8. A method as in claim 7 wherein said computing a value of an initial point step is performed during a time interval which elapses between two successive images.

9. A method as in claim 8 wherein said geometrical transformation includes a rotation, an affine transformation and a projection to produce a perspective effect.

10. An apparatus for performing a transformation on a video image, comprising:
  image memory means for storing a digital word representing characteristics of each point of an initial image;
  processing means for: (1) determining initial values for a point of a transformed image, and (2) determining a recurrence value between each point and an adjacent point of the transformed image; and
  adding means for producing a current address from an adjacent address by adding said recurrence value and one of (a) said initial value when said initial value is said adjacent address, and (b) the previous current address output by said adding means to thereby perform an adding operation between a recurrence value and the previous address used to produce a current address in real time.

11. Apparatus as in claim 10 wherein there are two recurrence values, a first recurrence value for calculating adjacent points which are on the same line, and a second recurrence value for calculating the value of another point based on a point which is on a different line.

12. Apparatus as in claim 11 further comprising means for multiplexing said initial values and said previous current address so that one of said initial values and said previous current address is applied to a first input of said adding means.

13. Apparatus as in claim 12 further comprising first register means coupled between an output of said processing means and a second input of said adding means for temporarily storing information output by said processing means; and
second register means coupled between an output of said processing means and an input of said multiplex means for temporarily storing said initial values output by said processing means and for providing said initial values at an output thereof to said multiplex means.

14. Apparatus as in claim 10 wherein said processing means is also for (3) controlling said multiplex means so that a proper input is coupled to said adding means.

15. Apparatus as in claim 14 wherein said adding means and said multiplex means are for one component of each point of the video image and wherein there are second adding means and second multiplex means for another component thereof.

16. A device according to claim 10 in which the initial video image is any desired image, further comprising:
  at least one counter for generating write address values at the point scanning frequency;
  wherein the image memory means is a memory having a capacity equal to one image, alternately written at an address supplied by the counters and read at an address supplied by the processing means at the point scanning frequency, the written data being the value of a digitized video signal corresponding to one field of the initial image and the read values being such as to constitute the values of a video signal corresponding to one field of the transformed initial image as a result of the geometrical transformation thereby resulting in an efficiency of operational transformation.

17. A device according to claim 10 further comprising means for generating control signals for a variable-gain video switcher, wherein the image memory means is for storing data defining a geometric figure.

* * * * *